(12) United States Patent
Cormican

(10) Patent No.: US 7,459,116 B1
(45) Date of Patent: *Dec. 2, 2008

(54) METHOD OF MANUFACTURING A SKI

(76) Inventor: Dale D. Cormican, Route 1 Box 153, Mentor, MN (US) 56736

(*) Notice: Subject to any disclaimer, the term of this patent is extended or adjusted under 35 U.S.C. 154(b) by 895 days.

This patent is subject to a terminal disclaimer.

(21) Appl. No.: 10/893,656

(22) Filed: Jul. 16, 2004

Related U.S. Application Data

(63) Continuation of application No. 09/935,080, filed on Aug. 21, 2001, now Pat. No. 6,764,635, which is a continuation-in-part of application No. 09/130,892, filed on Aug. 7, 1998, now Pat. No. 6,331,008.

(51) Int. Cl.
*B23P 11/00* (2006.01)
*B29C 53/02* (2006.01)

(52) U.S. Cl. .................. 264/295; 29/446; 29/525.01; 29/527.1; 264/320; 264/328.1; 264/339

(58) Field of Classification Search ............... 264/295, 264/320, 328.1, 339; 29/446, 525.01, 527.1
See application file for complete search history.

(56) References Cited

U.S. PATENT DOCUMENTS 6,086,101 A * 7/2000 Cormican .................. 280/809

* cited by examiner

*Primary Examiner*—Leo B Tentoni

(57) ABSTRACT

As shown in FIGS. 3 through 7, the first step within the manufacturing process is to mold an elongate body 20 having a relatively straight structure when compared to the final manipulated ski structure. The elongate body 20 is preferably comprised of a resilient and flexible material such as but not limited to ultra high molecular weight (UHMW) polyethylene (plastic). It can be appreciated that various other types of resilient and flexible materials may be utilized to construct the elongate body 20. Furthermore, the elongate body 20 may be created utilizing various molding processes such as but not limited to injection molding. Once the elongate body 20 has solidified, the elongate body 20 is removed from the respective mold by various conventional removal means.

20 Claims, 20 Drawing Sheets

METHOD OF MANUFACTURING A SKI

CROSS-REFERENCE TO RELATED U.S. PATENT APPLICATION

I hereby claim benefit under Title 35, United States Code, Section 120 of U.S. patent application Ser. No. 09/935,080 (now U.S. Pat. No. 6,764,635) filed Aug. 21, 2001 which was a continuation-in-part of Ser. No. 09/130,892 filed Aug. 7, 1998 (now U.S. Pat. No. 6,331,008). This application is a continuation of the 09/935,080 application. The Ser. No. 09/935,080 application, U.S. Pat. No. 6,764,635 and U.S. Pat. No. 6,331,008 are hereby incorporated by reference into this patent application.

BACKGROUND OF THE INVENTION

1. Field of the Invention

The present invention relates generally to methods for manufacturing skis for use upon snowmobiles and like vehicles that operate upon snow, and more specifically it relates to a method of manufacturing a ski for creating a preload force upon a front portion of a ski in combination with a resilient preload member.

2. Description of the Prior Art

Skis for snowmobiles and like vehicles have been in use for years. A snowmobile or like vehicle typically is comprised of a frame, a track within the rear portion of the vehicle, and a pair of skis controllably attached to a steering structure of the vehicle. Skis are utilized for supporting and steering the vehicle during operation upon snow and other surfaces.

Skis for snowmobiles and like vehicles are typically constructed of either metal, or a combination of metal and plastic. Regardless of the material utilized, conventional skis for snowmobiles and like vehicles are manufactured utilizing the same process as shown in FIGS. 1 and 2 of the drawings. More particularly, the ski is molded with the desired curvature within the front portion of the ski and a loop member is attached to the tip of the front portion and the ski without stressing the front portion of the ski (i.e. the front portion is in a relatively relaxed state). FIGS. 1 and 2 also illustrate the usage of a rigid metal saddle removably attached to an upper surface of the ski body for securing to the snowmobile.

Regarding metal only skis, each ski is formed into an elongate rigid structure having a relatively straight rear to middle portion with a front portion containing a desired curvature utilizing conventional metal working procedures without stress existing within the front portion. A stiff loop member, usually constructed of an elongate metal rod structure, is attached to the front end of the ski and to the middle portion of the ski. The loop member is typically welded to the front end of the ski and to the middle portion of the ski. The loop member is designed for preventing the pointed front end from injuring a third-party, for grasping when attempting to move the snowmobile, and for increasing the overall strength of the front portion when encountering obstacles during forward movement of the vehicle.

More recently, skis for snowmobiles and like vehicles have been constructed of a combination metal and resilient plastic, such as ultra high molecular weight (UHMW) polyethylene, which allows for increased flexibility of the ski when encountering obstacles. The main body of the ski is comprised of a plastic material typically manufactured utilizing injection molding or blow molding wherein the rear portion to middle portion is molded relatively straight with the front portion molded to possess the desired curvature without stress existing within the front portion. A rigid metal saddle is attached to the middle portion of the plastic ski for allowing attachment of the ski to the front suspension of the snowmobile. A loop member, typically constructed of plastic, is attached to the front end of the ski and then to the middle portion of the ski with no stress contained within the front portion thereof. As with loop members utilized with metal skis, the loop member is designed for preventing the front end of the ski from injuring a third-party, for grasping when attempting to move the snowmobile, and for increasing the overall strength of the front portion when encountering obstacles during forward movement of the vehicle.

One of the main problems with conventional ski manufacturing processes, for either metal or metal-plastic skis, is that they mold the front portion of the ski into the desired curvature and then secure a loop member between the middle of the ski to the front end of the ski in order to keep the front end of the ski from bending rearwardly when engaging obstacles. A further problem with conventional ski manufacturing processes is that they cause the front portion of the ski to be less flexible because of the loop member attempts to keep the front end of the ski in the current position. A further problem with conventional ski manufacturing processes is that the combination of the loop member and the static curved portion creates a rigid structure that is unable to significantly flex when encountering an obstacle. Another problem with conventional ski manufacturing processes is that the rigid front portion of the ski attempts to "pivot" about the connection point of the loop member in the middle portion of the ski since the front portion is unable to significantly flex when encountering an obstacle.

While conventional ski manufacturing processes may be suitable for the particular purpose to which they address, they are not as suitable for creating a preload force upon a front portion of a ski utilizing a resilient preload member thereby enhancing the overall performance of the ski. Conventional ski manufacturing processes create a semi-rigid structure within the front portion of the ski thereby reducing their ability to properly flex when encountering obstacles.

In these respects, the method of manufacturing a ski according to the present invention substantially departs from the conventional concepts and designs of the prior art, and in so doing provides an apparatus primarily developed for the purpose of creating a preload force upon a front portion of a ski in combination with a resilient preload member.

SUMMARY OF THE INVENTION

In view of the foregoing disadvantages inherent in the known types of skis and ski manufacturing processes now present in the prior art, the present invention provides a new method of manufacturing a ski wherein the same can be utilized for creating a preload force upon a front portion of a ski in combination with a resilient preload member.

The general purpose of the present invention, which will be described subsequently in greater detail, is to provide a new method of manufacturing a ski that has many of the advantages of the skis and method of manufacturing mentioned heretofore and many novel features that result in a new method of manufacturing a ski which is not anticipated, rendered obvious, suggested, or even implied by any of the prior art, either alone or in any combination thereof.

To attain this, the present invention generally comprises the steps of molding an elongate ski body having a front portion in a position P1, removing the elongate ski body from the mold after solidified, applying a force upon a front portion of the elongate ski body thereby bowing the front portion into position P2, securing a preload member to the front portion and a middle portion of the elongate ski body, and releasing the force applied to the front portion whereby the resiliency of the front portion deforms the preload member until the front portion is into position P3. Position P1 of the elongate ski body is preferably less than 20 degrees with respect to a longitudinal axis of the elongate ski body.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a method of manufacturing a ski that will overcome the shortcomings of the prior art devices.

A second object is to provide a method of manufacturing a ski for creating a preload force upon a front portion of a ski utilizing a resilient preload member.

Another object is to provide a method of manufacturing a ski that does not create a "pivot point" within the middle portion of the ski.

An additional object is to provide a method of manufacturing a ski that increases the overall performance of the ski in a variety of conditions.

A further object is to provide a method of manufacturing a ski that allows the front portion of the ski to flex rearwardly without resistance by a loop member.

A further object is to provide a method of manufacturing a ski that allows for the front portion of the ski to be molded either significantly straight or with a slight curvature.

Another object is to provide a method of manufacturing a ski that provides a ski wherein the loop member is able to absorb a significant amount of rearward and upwardly movement by the front portion of the ski without providing a counteracting force thereto.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

A. Overview

Figure 1:
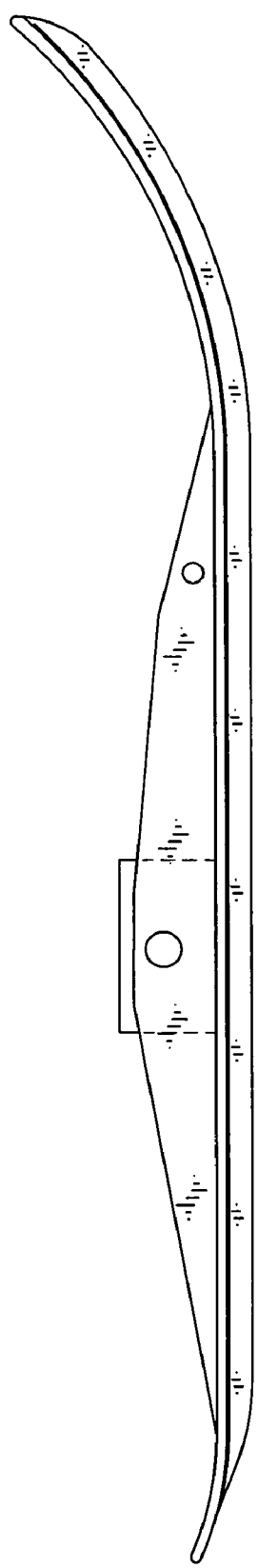
FIG. 1 is a side view of a prior art manufactured ski body illustrating the front portion being molded with the desired curvature within without being stressed.
Figure 2:
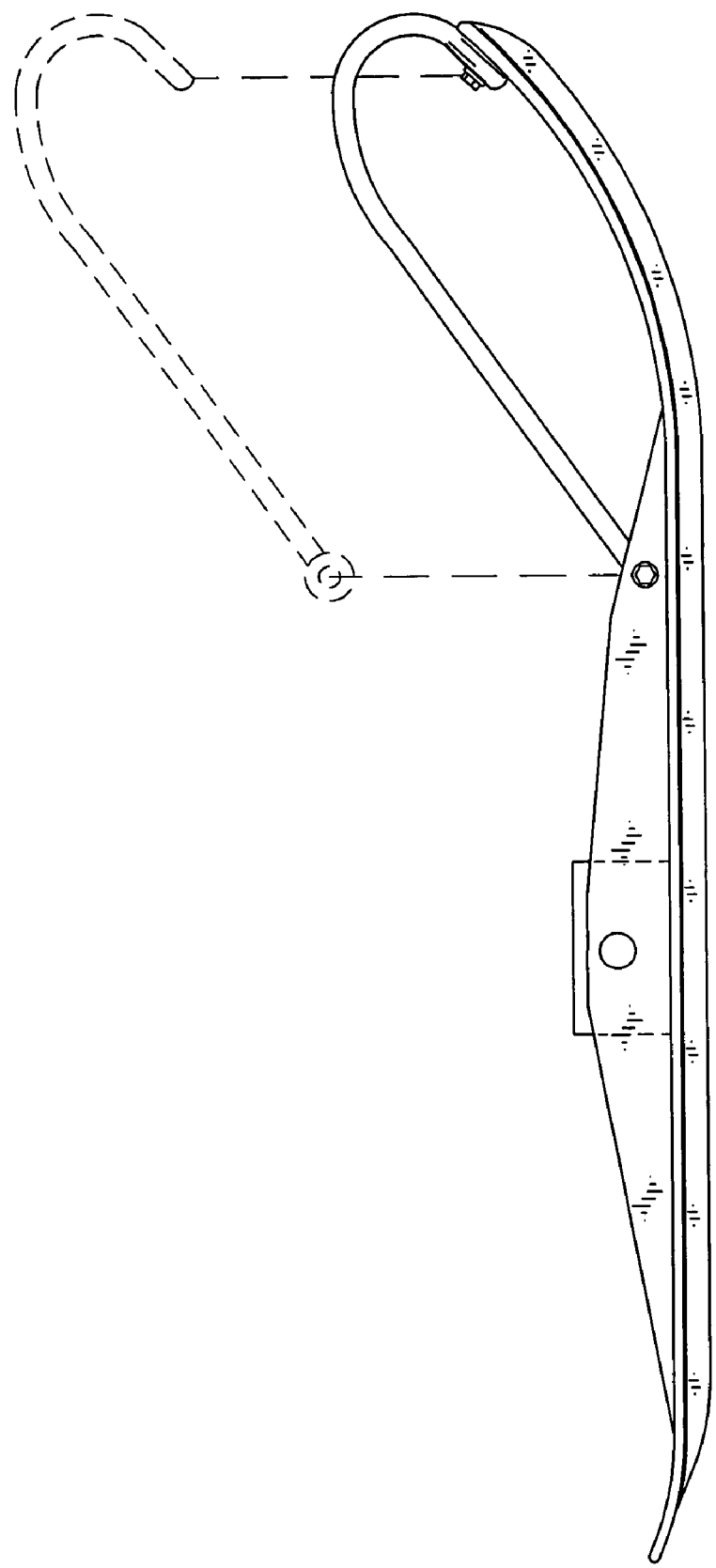
FIG. 2 is a side view of the prior art with the loop member attached to the middle portion and the front end of the ski without stressing the front portion of the ski.
Figure 3:
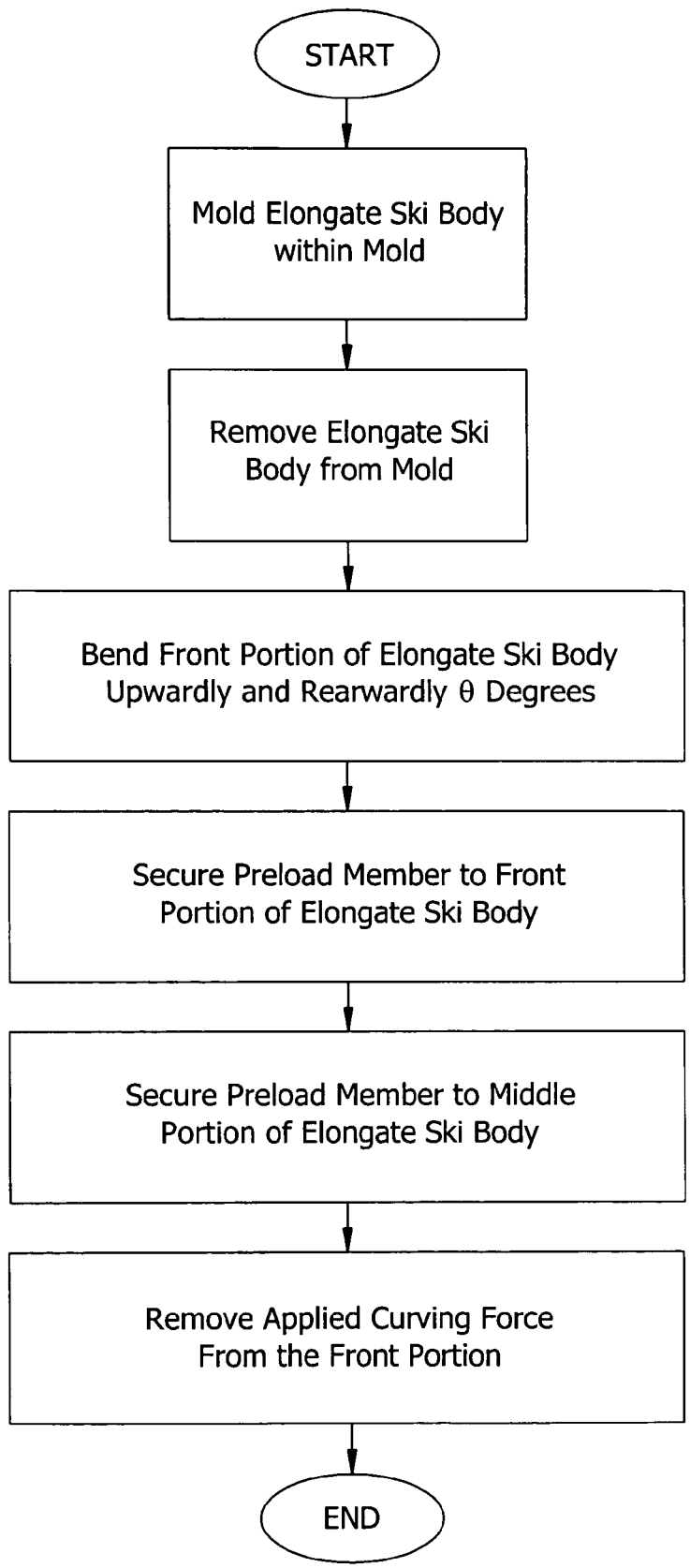
FIG. 3 is a flowchart illustrating the overall manufacturing process of the present invention.

Turning now descriptively to the drawings, in which similar reference characters denote similar elements throughout the several views, FIGS. 1 through 20 illustrate a method of manufacturing a ski 10, which basically comprises the steps of molding an elongate ski body 20 having a front portion 22 in an initial position P1, removing the elongate ski body 20 from the mold after solidified, applying a force upon a front portion 22 of the elongate ski body 20 thereby bowing the front portion 22 into an intermediary position P2, securing a preload member 50 to the front portion 22 and a middle portion 26 of the elongate ski body 20, and releasing the force applied to the front portion 22 whereby the resiliency of the front portion 22 deforms the preload member 50 until the front portion 22 is into a final position P3. Position P1 of the elongate ski body 20 is preferably less than 20 degrees with respect to a longitudinal axis of the elongate ski body 20.

B. Molding the Elongate Body

As shown in FIGS. 3 through 7, the first step within the manufacturing process is to mold an elongate body 20 having a relatively straight structure when compared to the final manipulated ski structure. The elongate body 20 is preferably comprised of a resilient and flexible material such as but not limited to ultra high molecular weight (UHMW) polyethylene. It can be appreciated that various other types of resilient and flexible materials may be utilized to construct the elongate body 20. Furthermore, the elongate body 20 may be created utilizing various molding processes such as but not limited to injection molding. Once the elongate body has solidified, the elongate body 20 is removed from the respective mold by various conventional removal means.

Figure 4:
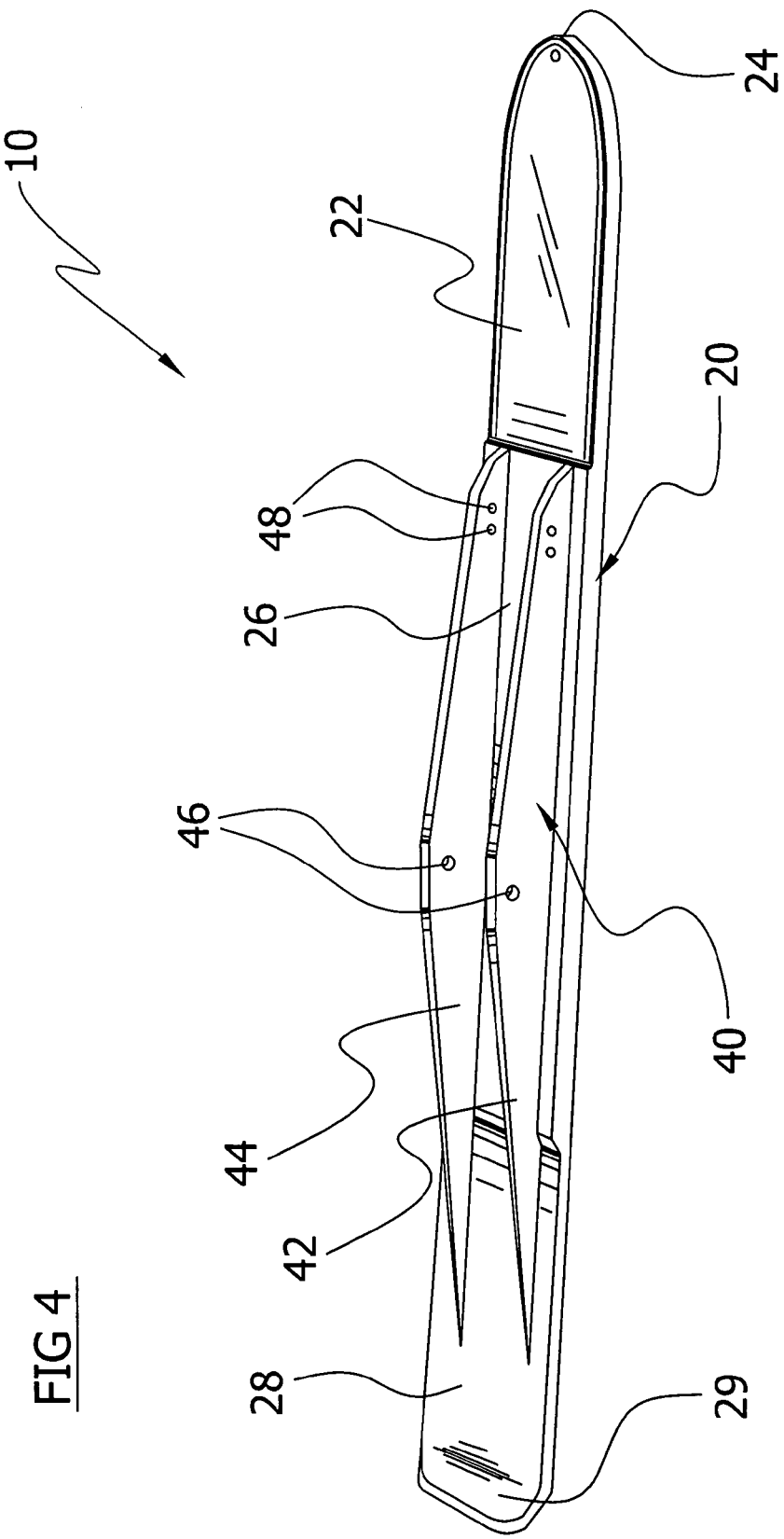
FIG. 4 is an upper perspective view of the elongate ski body as initially molded with the front portion in a substantially straight structure.
Figure 5:
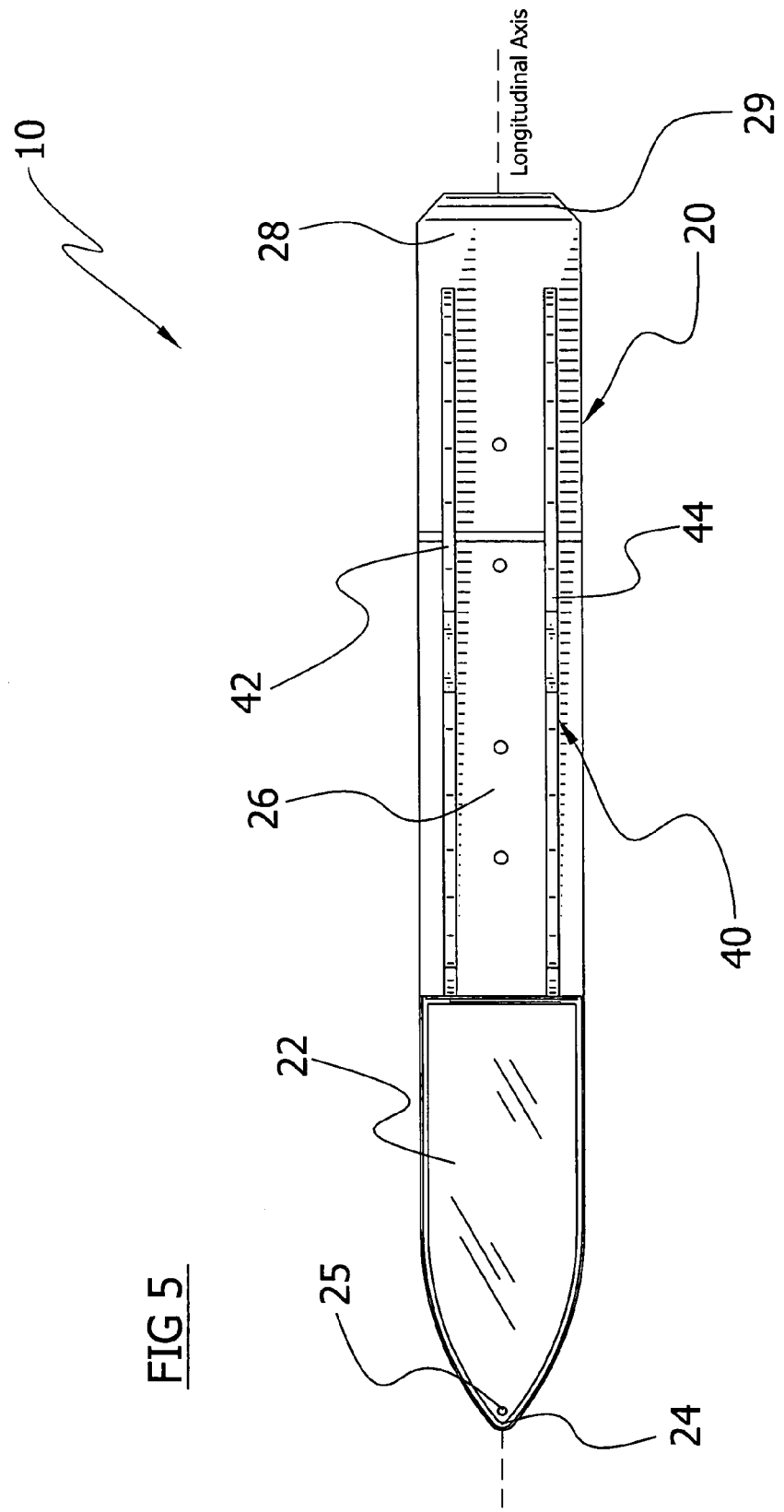
FIG. 5 is a top view of the elongate ski body as initially molded with the front portion in a substantially straight structure.
Figure 6:
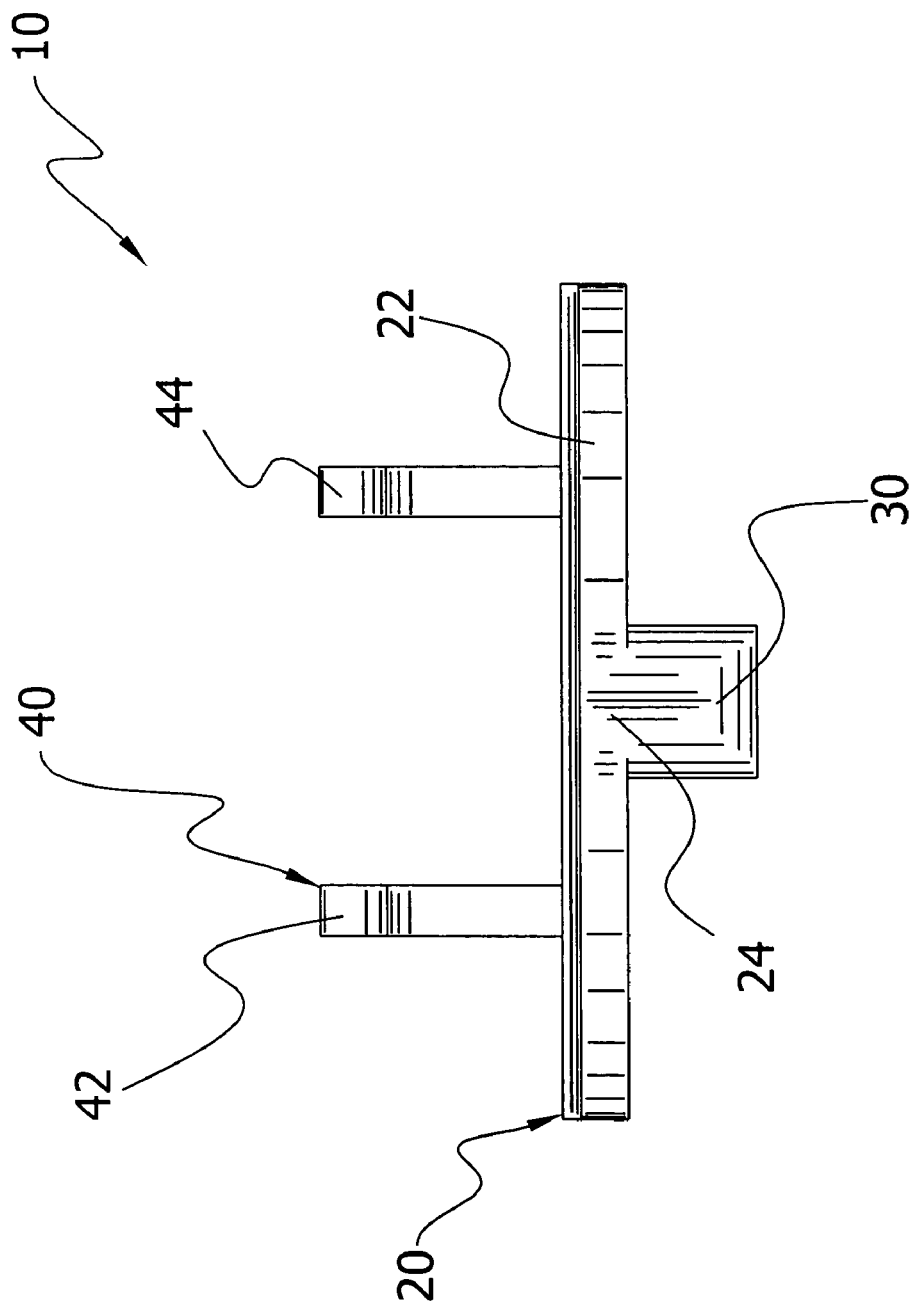
FIG. 6 is a front end view of the elongate ski body as initially molded with the front portion in a substantially straight structure.
Figure 7:
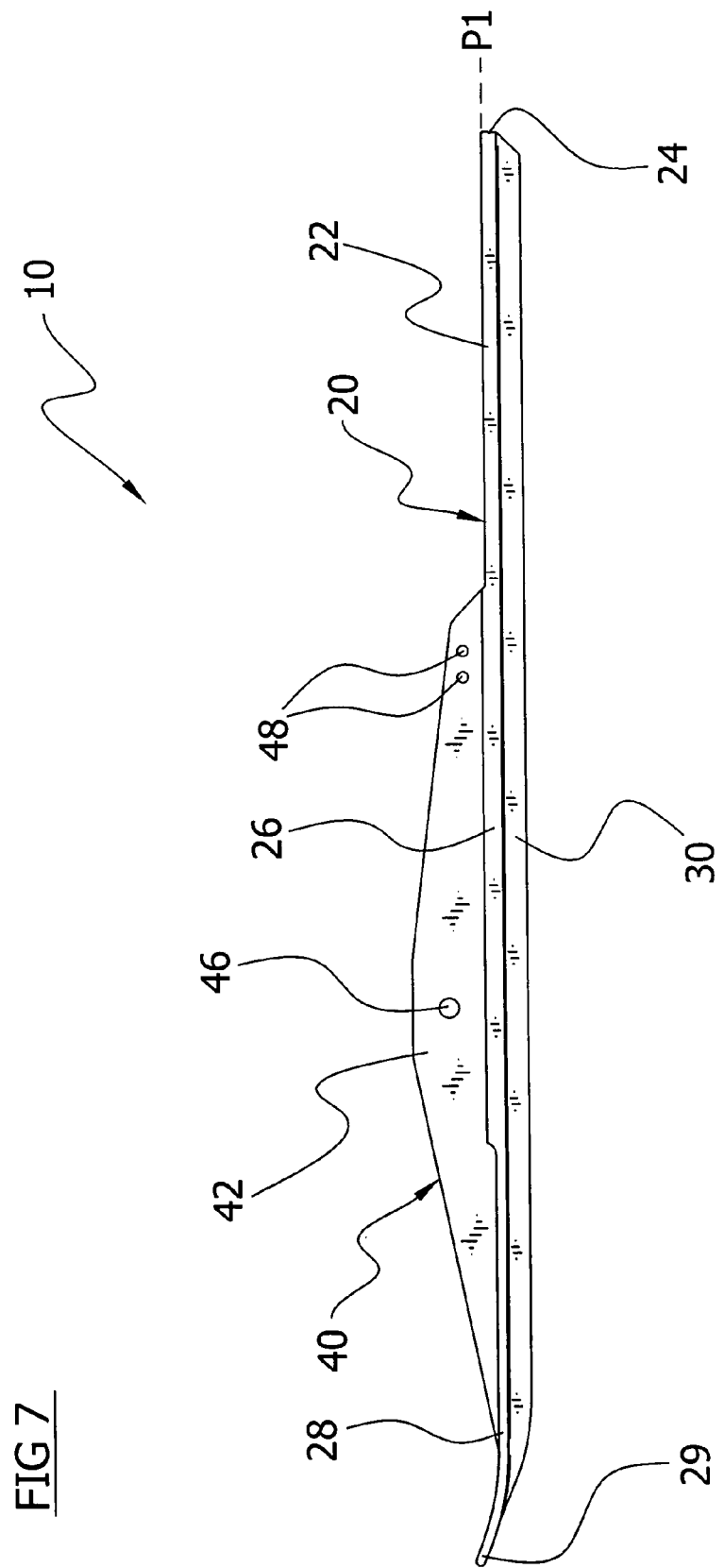
FIG. 7 is a side view of the elongate ski body as initially molded with the front portion in a substantially straight structure.

As further shown in FIGS. 4 through 7 of the drawings, the elongate body 20 is basically comprised of a front portion 22 having a front end 24, a middle portion 26 and a rear portion 28 having a rear end 29. The elongate body 20 has a generally flat structure except for the saddle portion 40 and the keel member 30 as best illustrated in FIGS. 4, 6 and 7 of the drawings. It can be appreciated that the elongate body 20 may have various shapes other than a flat shape that are able to act as a ski. The elongate body 20 has an upper surface and a lower surface which are substantially parallel to one another which may have a varying or consistent thickness throughout.

As shown in FIGS. 4 through 7 of the drawings, a saddle portion 40 extends upwardly from the upper surface of the elongate body 20. The saddle portion 40 is preferably molded integral within the elongate body 20, however the saddle portion 40 may be attached to the elongate body 20 by conventional fastening means. The saddle portion 40 extends from the middle portion 26 of the elongate body 20 thereby substantially defining the middle portion 26 of the elongate body 20 with the front portion 22 and the rear portion 28 on opposing ends of the saddle portion 40. The middle portion 26 may extend a finite distance past the distal ends of the saddle portion 40 as can be appreciated. The boundaries of the middle portion 26 therefore should not be limited to the area of the elongate body 20 supporting the saddle portion 40. It should be noted that the terminology front portion 22, middle portion 26 and rear portion 28 are merely utilized to illustrate the present invention and should not limit the scope of the invention.

The saddle portion 40 is preferably comprised of a first member 42 and a second member 44 extending substantially parallel to one another in a distally spaced relationship as is best illustrated in FIG. 4 of the drawings. Each member 42, 44 includes a main aperture 46 for receiving a pin member that secures the elongate body 20 to the front suspension of a snowmobile or like vehicle. The saddle portion 40 may have various shapes other than that illustrated within the drawings.

As shown in FIGS. 4, 6 and 7 of the drawings, the rear end 29 of the rear portion 28 is preferably curved for allowing the elongate body 20 to move rearwardly without catching upon the surface. However, it can be appreciated that the rear end 29 may have various other shapes such as but not limited to straight and slanted.

Figure 8:
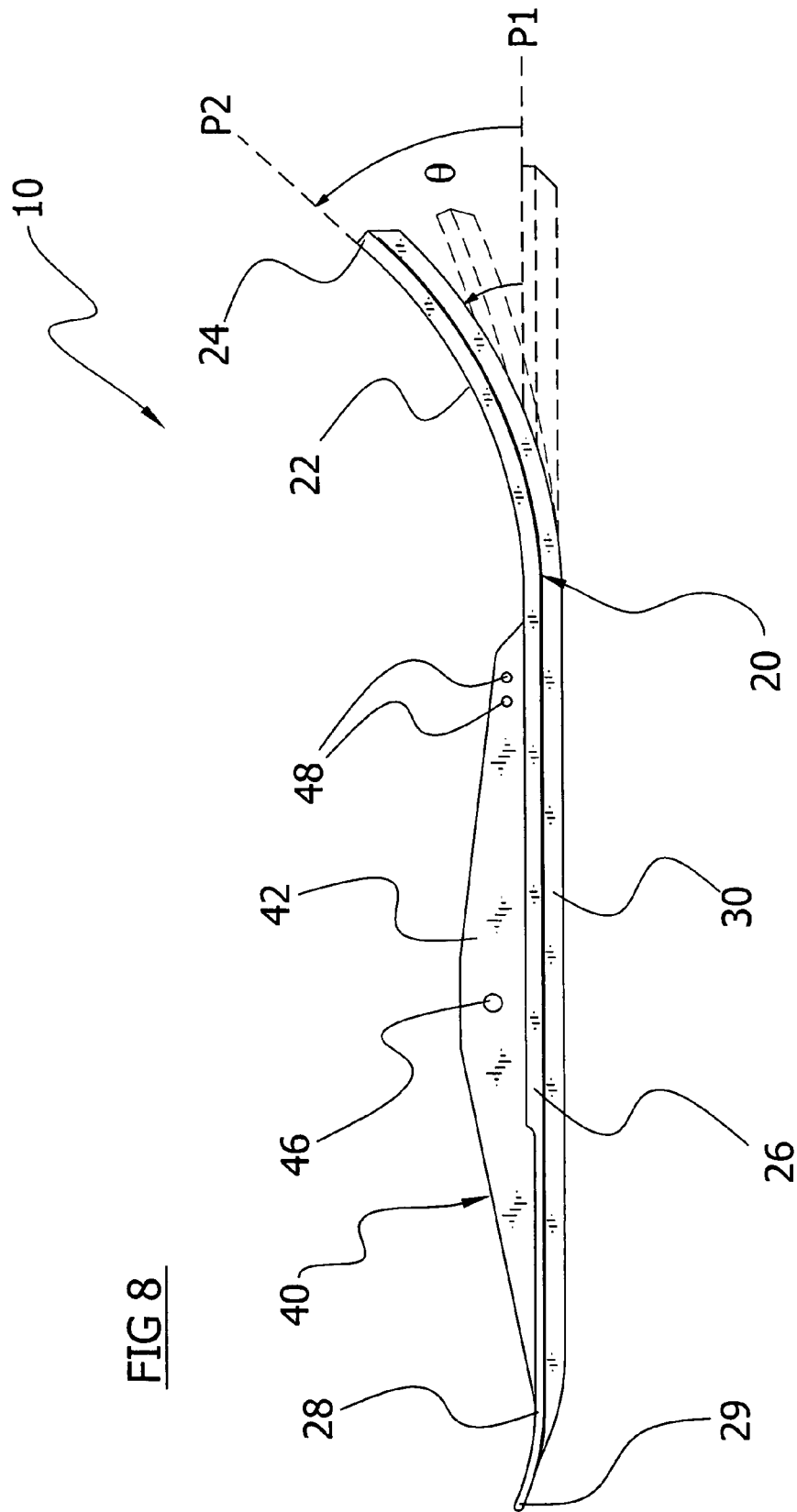
FIG. 8 is a side view of the elongate ski body with the front portion being bowed from position P1 to position P2 having an angle θ between the relative positions.

The rear portion 28, middle portion 26 and the front portion 22 define a substantially straight structure having a longitudinal axis extending from the rear portion 28 to the middle portion 26 of the elongate body 20, wherein the longitudinal axis is parallel to the upper surface of the middle portion 26 of the elongate body 20. The front portion 22 is initially molded into a position P1 as shown in FIGS. 7 and 8 of the drawings. The outer perimeter of the front portion 22 preferably is thicker than the central portion thereof for providing a warped structure when bent, however it can be appreciated that the front portion 22 may be comprised of a flat structure or variations thereof to achieve various results.

Figure 19:
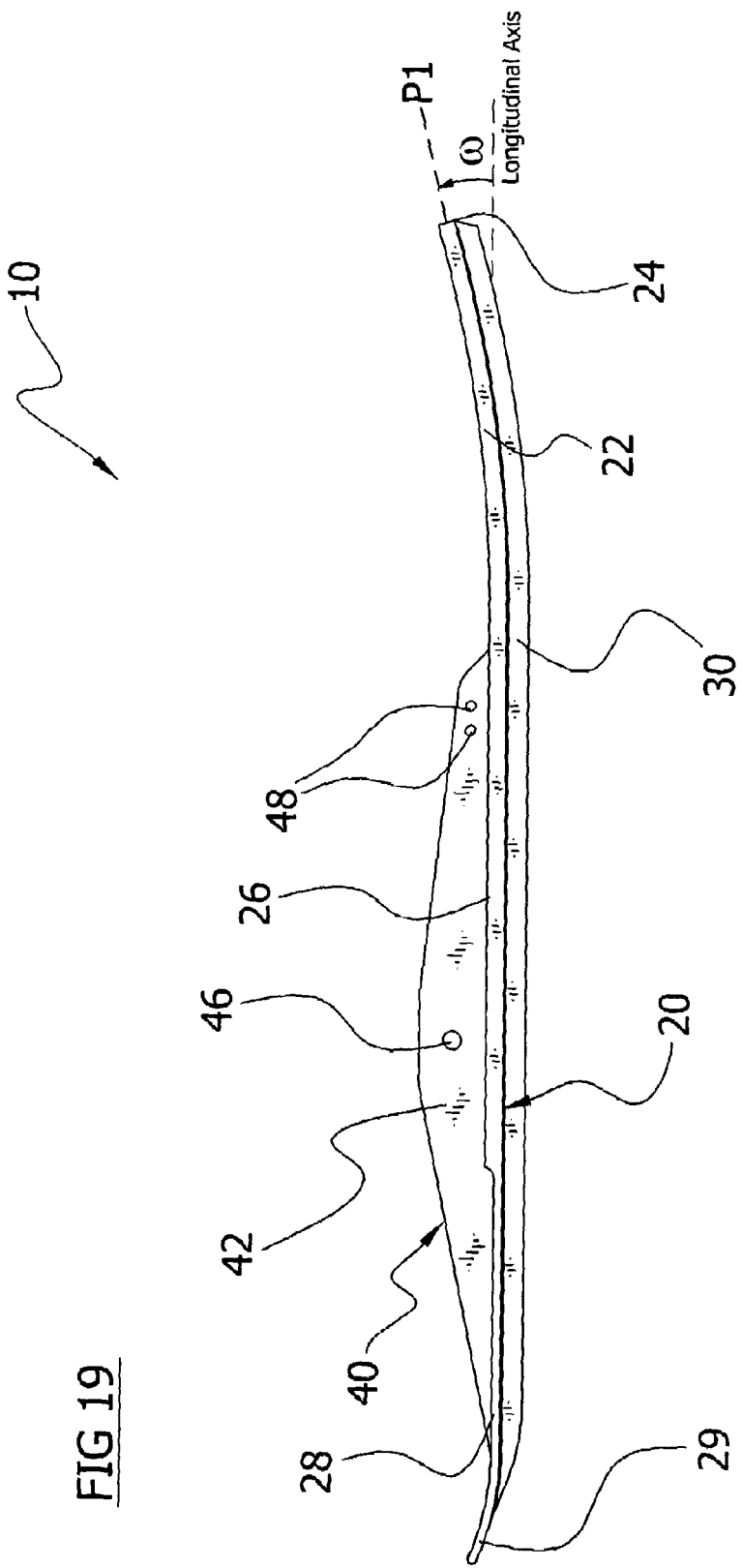
FIG. 19 is a side view of the elongate ski body as initially molded wherein the front portion has either a preformed slight curvature or angle thereto.
Figure 20:
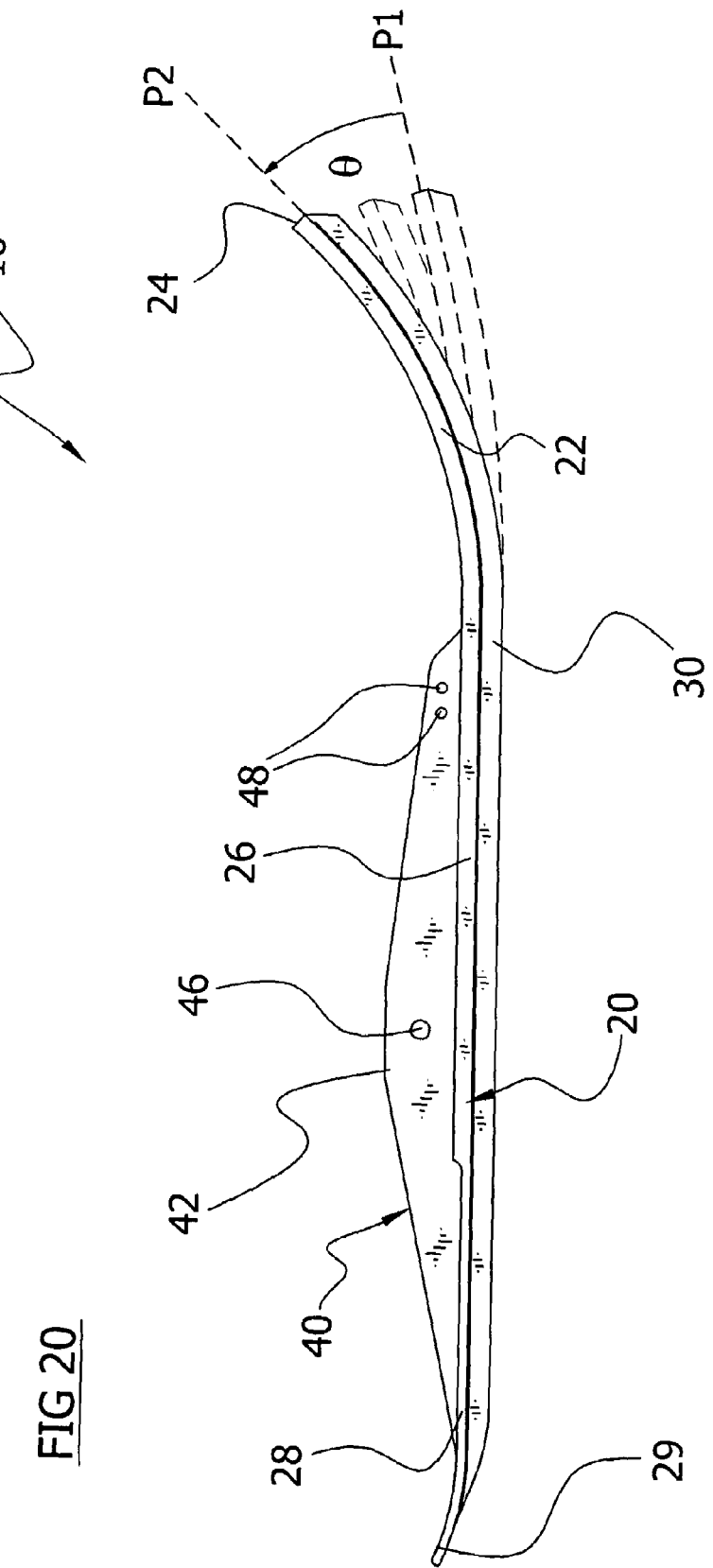
FIG. 20 is a side view of the elongate ski body of FIG. 19 with the front portion being bowed from position P1 to position P2 having an angle θ between the relative positions.

The position P1 is represented by a phantom line extending from the front end 24 that is parallel to the upper surface of the front end 24 of the front portion 22 of the elongate body 20 as best illustrated in FIG. 7 of the drawings. The position P1 preferably has an angle of less than 20 degrees with respect to the longitudinal axis of the elongate body 20. The position P1 may extend upwardly or downwardly with respect to the longitudinal axis in a range of plus or minus 20 degrees respectively. The applicant has found that the best results occur when the initial molded position P1 is between 0 to 10 degrees with respect to the longitudinal axis. FIGS. 19 and 20 illustrate the elongate body 20 with the front portion 22 initially molded with a curvature, slant or other inclined structure with the initial position P1 approximately 10 degrees with respect to the longitudinal axis.

At least one pair of receiving apertures 48 extend through the saddle portion 40 in opposition to one another adjacent the front portion 22 of the elongate body 20 as further shown in FIG. 4 of the drawings. More than one pair of receiving apertures 48 is preferably utilized for allowing for the adjustment of the preload member 50. The receiving apertures 48 are formed for receiving at least one fastener 60 extending through the preload member 50 for securing the preload member 50 to the middle portion 26 of the elongate body 20. It can be appreciated that various other connection means may be utilized to secure the preload member 50 to the middle portion 26 of the elongate body 20 and the illustration of the receiving apertures 48 should not limit the scope of the invention. For example, the preload member 50 may be attached nonmovably or movably to the middle portion 26 of the elongate body 20 without being attached directly to the saddle portion 40.

As shown in FIG. 7 of the drawings, at least one keel member 30 preferably extends from a lower surface of the elongate body 20 that is utilized for increasing the steering abilities of the finalized product. The keel member 30 may extend from or near the rear end 29 to the front portion 22 of the elongate body 20. The keel member 30 is preferably centered within the lower surface of the elongate body 20, however it can be appreciated that various other locations upon the elongate body 20 may be utilized particularly if multiple keel members 30 are utilized. The keel member 30 is preferably parallel to the longitudinal axis of the elongate body 20. The keel member 30 is preferably molded within the elongate body 20, however the keel member 30 may be removably attached thereto. In addition, the keel member 30 is preferably formed for receiving a wear rod member (not shown) commonly utilized upon snowmobile skis and the like for reducing wear upon the keel member 30 and the elongate body 20 during usage.

C. Bending the Front Portion

After the elongate body 20 is removed from the mold, the user then applies an upward and/or rearward bending force upon the front portion 22 of the elongate body 20. The bending force is preferably applied with the elongate body 20 within a solidified and relatively cooled state to allow for a sufficient bowing force to exist within the front portion 22 when manipulated. The bending force may be applied utilizing various types of tools, mechanical devices or simply with an individual physically applying force to the elongate body 20 in a controlled manner. The front end 24 or adjacent thereto is preferably engaged with the bending force to achieve the most desirable results.

The bending force causes the front portion 22 to bow upwardly and rearwardly until the front portion 22 is formed into the intermediary position P2 as shown in FIGS. 8 and 20 of the drawings. The intermediary position P2 has an angle θ with respect to the initial position P1 as shown in FIGS. 8 and 20 of the drawings. The intermediary position P2 allows for the attachment of the preload member 50 to the front end 24 and the middle portion 26 of the elongate body 20. The angle θ shown in FIG. 8 is approximately 48 degrees and the angle θ shown in FIG. 20 is approximately 33 degrees. It can be appreciated that the angle θ will vary depending upon the initial position P1 and the intermediary position P2. However, the angle θ is preferably at least 10 degrees to provide for sufficient tensioning of the front portion 22 and the preload member 50.

Figure 14:
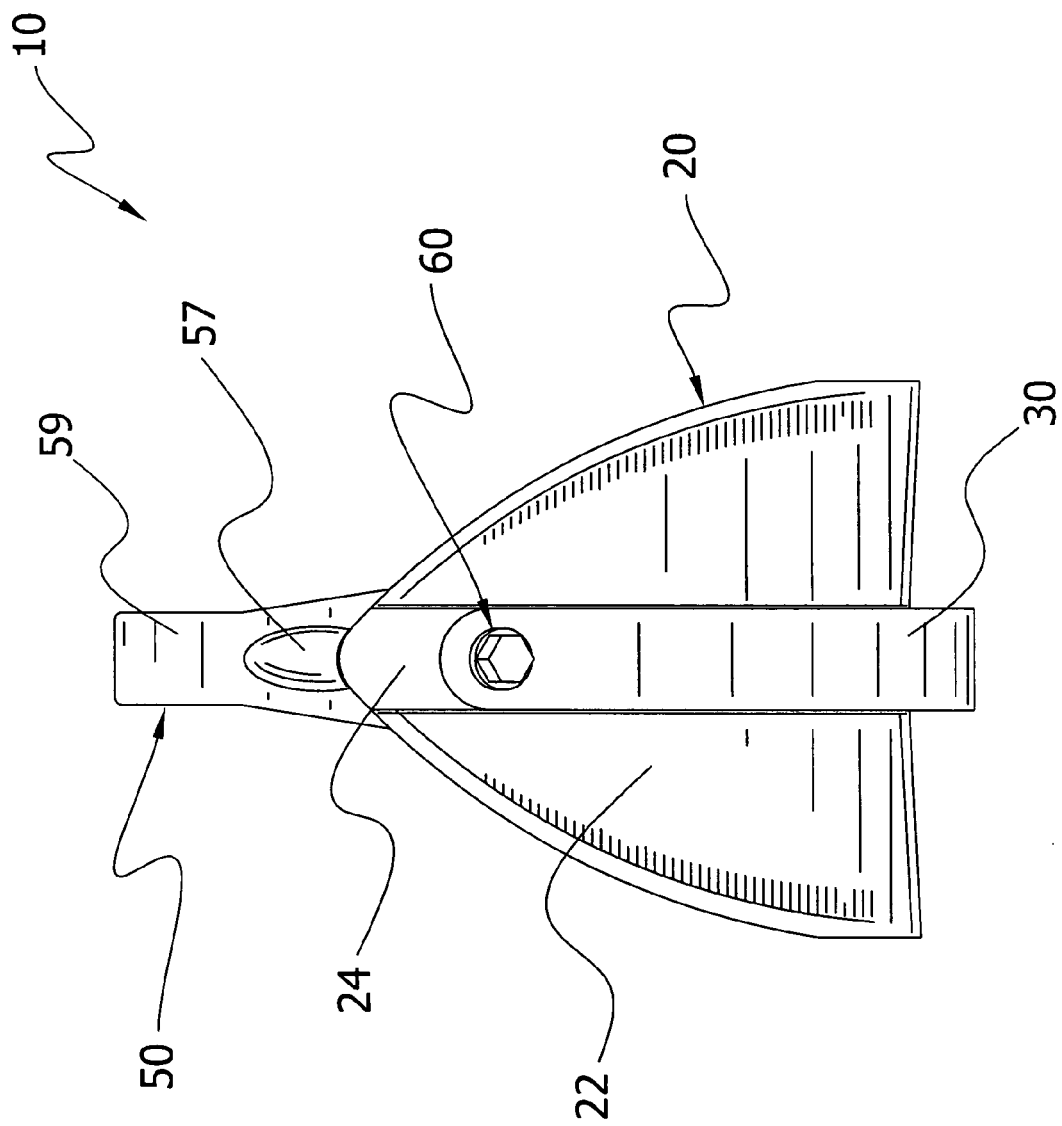
FIG. 14 is a front end view of the ski body with the front portion bowed upwardly and rearwardly.
Figure 15:
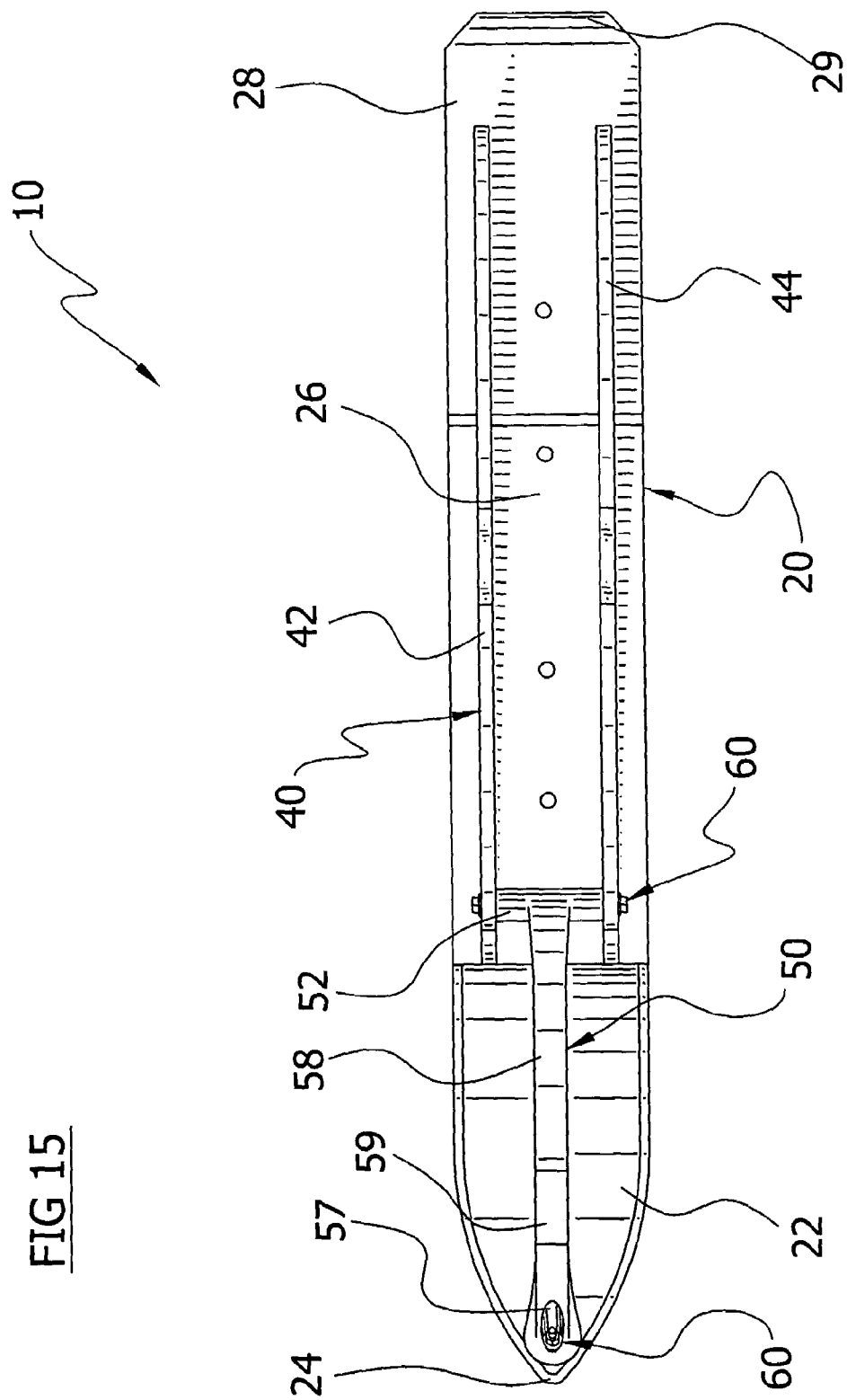
FIG. 15 is a top view of the elongate ski body with the front portion bowed upwardly and rearwardly.
Figure 16:
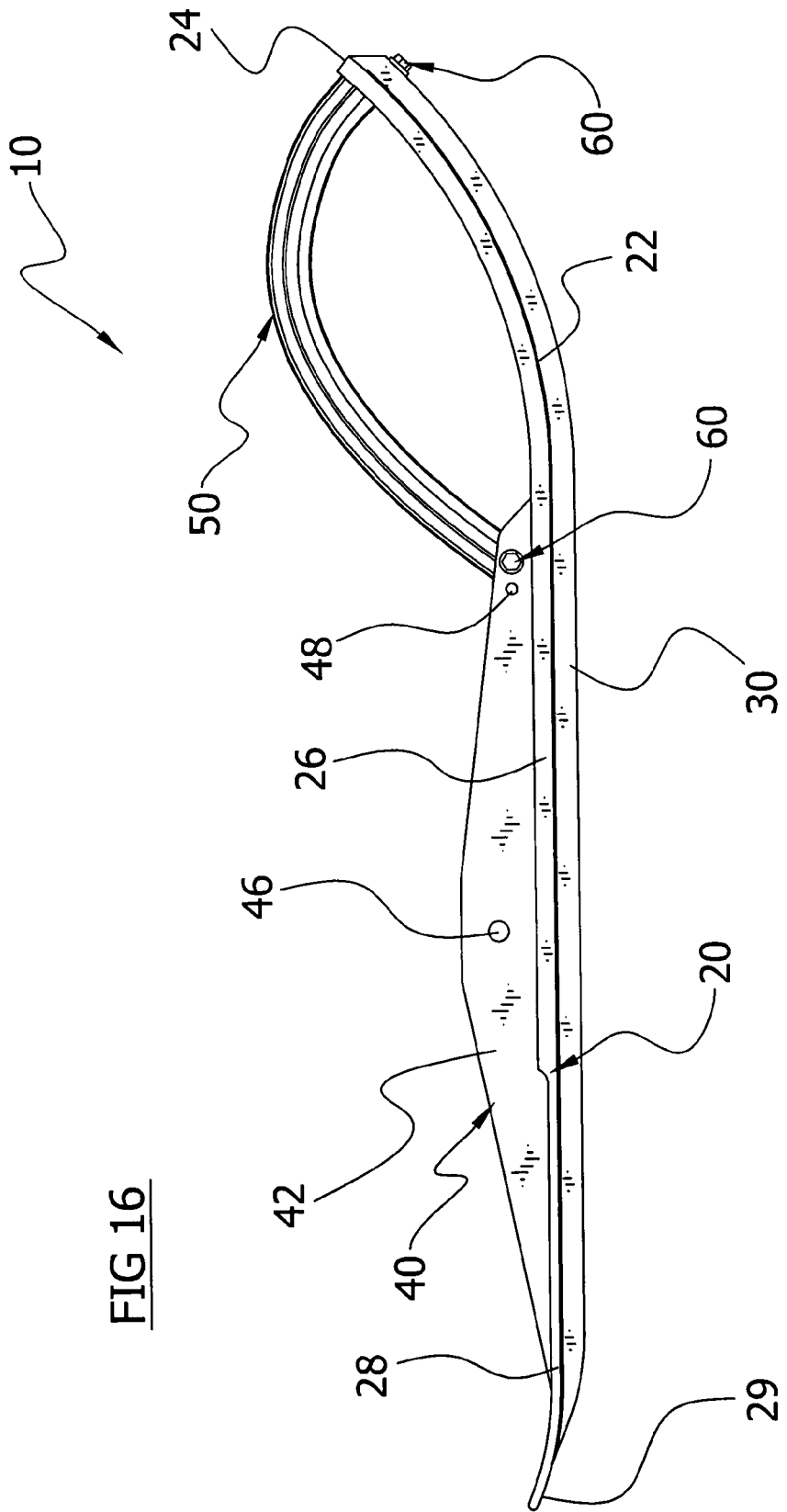
FIG. 16 is a side view of the elongate ski body with the front portion retained within a bowed position by an alternative preload member.

It should be noted that when the front portion 22 is bowed upwardly and rearwardly that a first portion of the front portion 22 will bow outwardly from opposing sides of the center keel member 30 as shown in FIG. 14 of the drawings. The first portion of the front portion 22 of the elongate body 20 containing the outwardly bowed structure allows for the directing of snow inwardly toward the central portion of the elongate body 20 thereby increasing the ability of the elongate body 20 to float and steer upon the snow surface.

D. Securing the Preload Member

Figure 17:
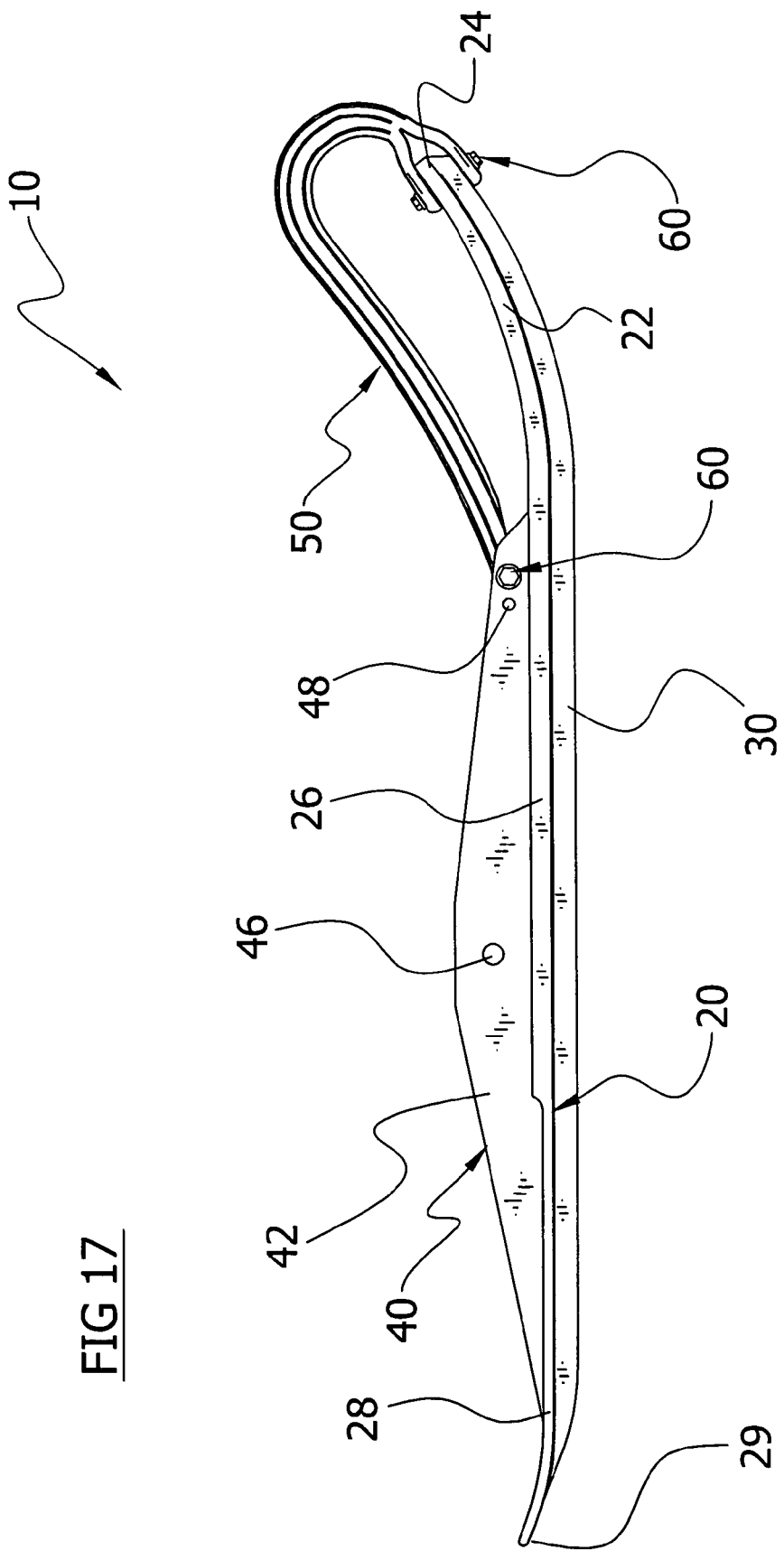
FIG. 17 is a side view of the elongate ski body with the front portion retained within a bowed position by a second alternative preload member.
Figure 18:
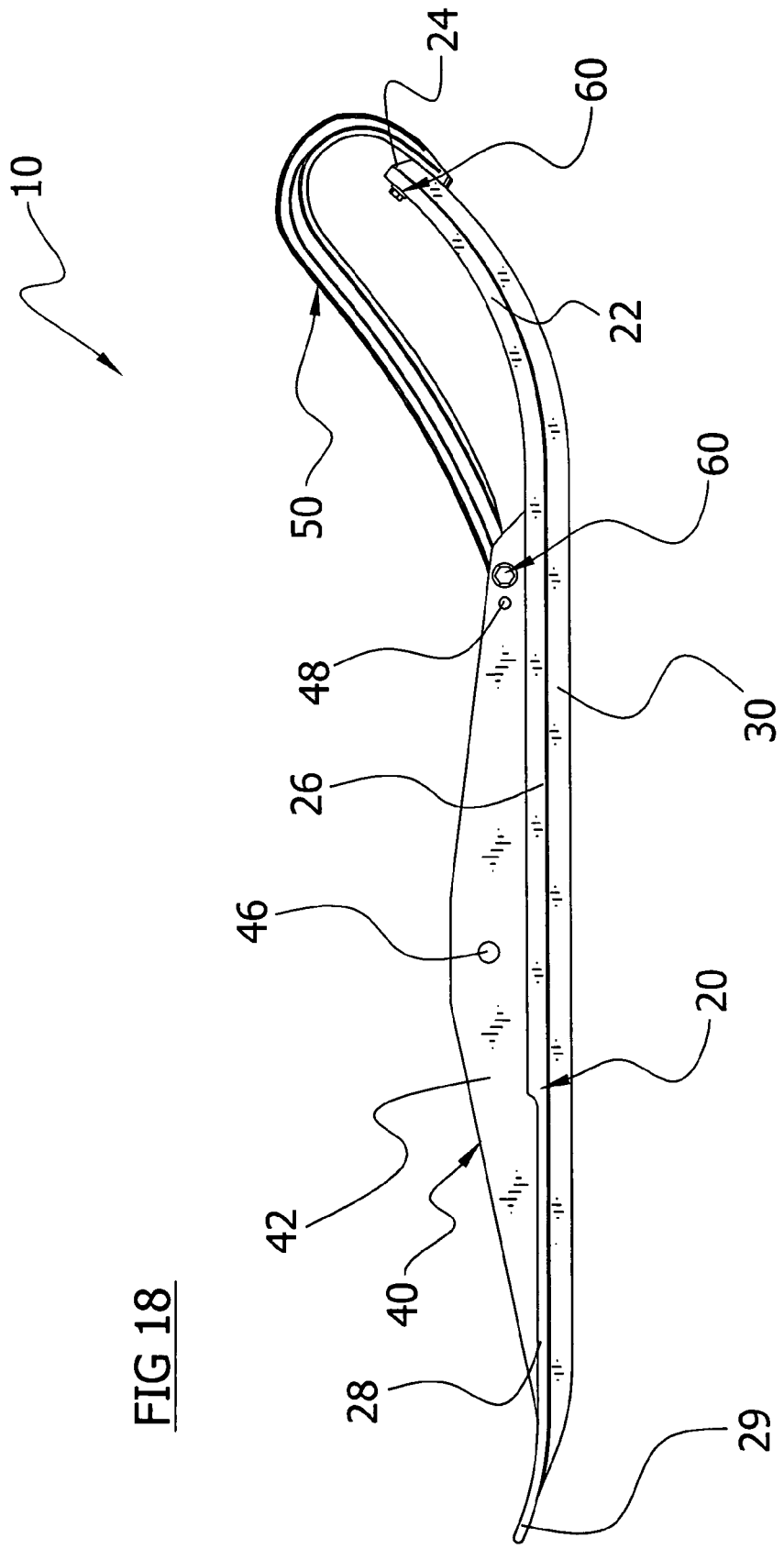
FIG. 18 is a side view of the elongate ski body with the front portion retained within a bowed position by a third alternative preload member.

The preload member 50 is preferably comprised of a resilient and flexible material for creating a preload within the front portion 22 of the elongate body 20 and within the preload member 50. The preload member 50 may have various structures as illustrated in FIGS. 9 through 18 of the drawings. For example, the preload member 50 may have a first section with a straight structure and a second section with a curved structure as shown in FIG. 18 of the drawings. The preload member 50 may have an overall curved structure as shown in FIG. 17 of the drawings.

Figure 11:
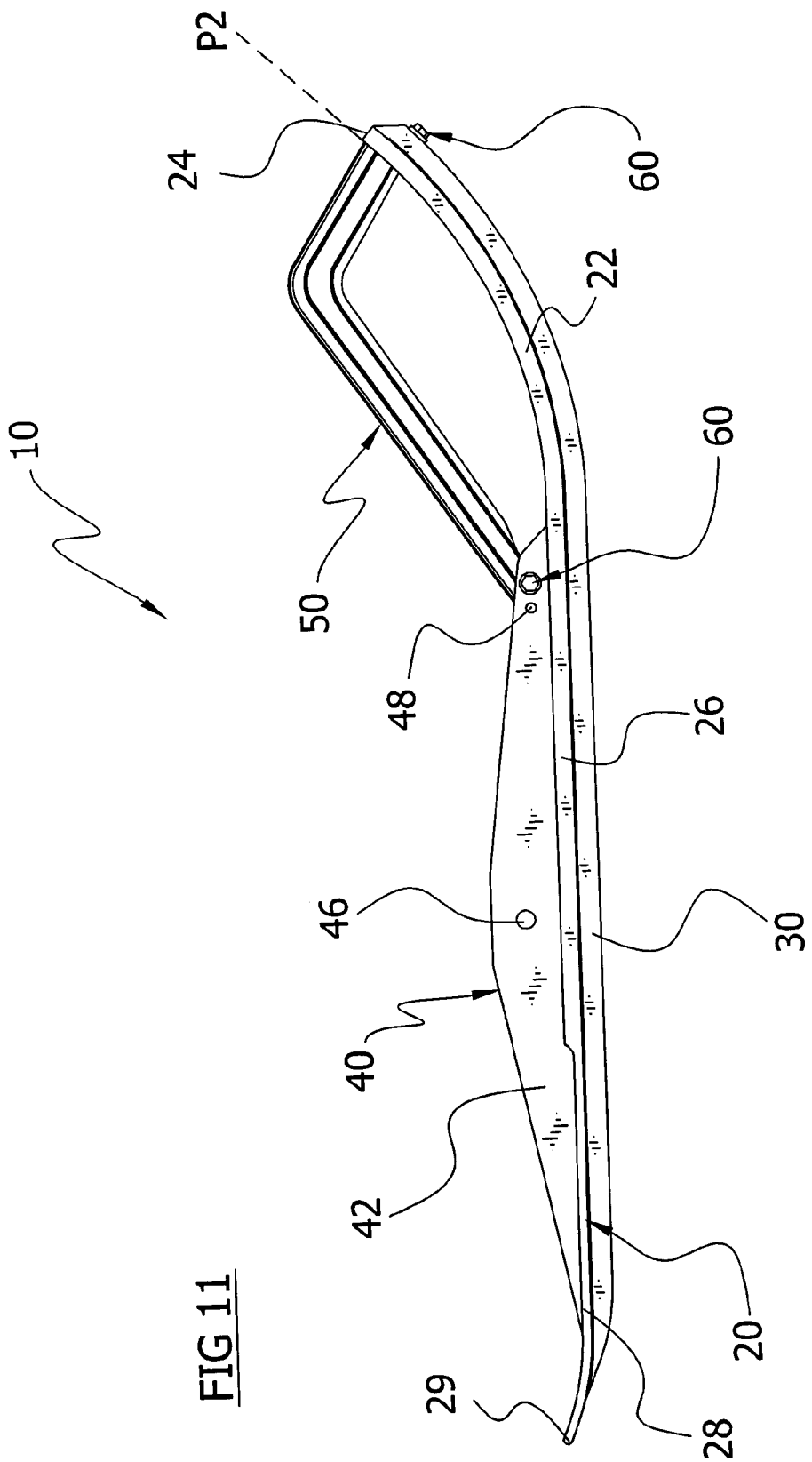
FIG. 11 is a side view of the preload member attached to the front end and the middle portion of the ski body illustrating the forward force of the front portion stressing the preload member until the front portion is within position P3.

The inventor has determined that the best mode of manufacturing and operating the present invention is to mold a preload member 50 comprised of a first segment 58 and a second segment 59 wherein the segments 58, 59 are with respect to one another at an angle. The segments 58, 59 are preferably at least 90 degrees with respect to one another, however greater or less angles may be utilized to construct the preload member 50. In addition, the first segment 58 is preferably longer than the second segment 59 as is best illustrated in FIG. 11 of the drawings. The first segment 58 and the second segment 59 are preferably comprised of a straight structures, however various other structures may be utilized. The first segment 58 and the second segment 59 are preferably molded as a single unit, however it can be appreciated that the preload member 50 may be comprised of a plurality of components secured together.

Figure 10:
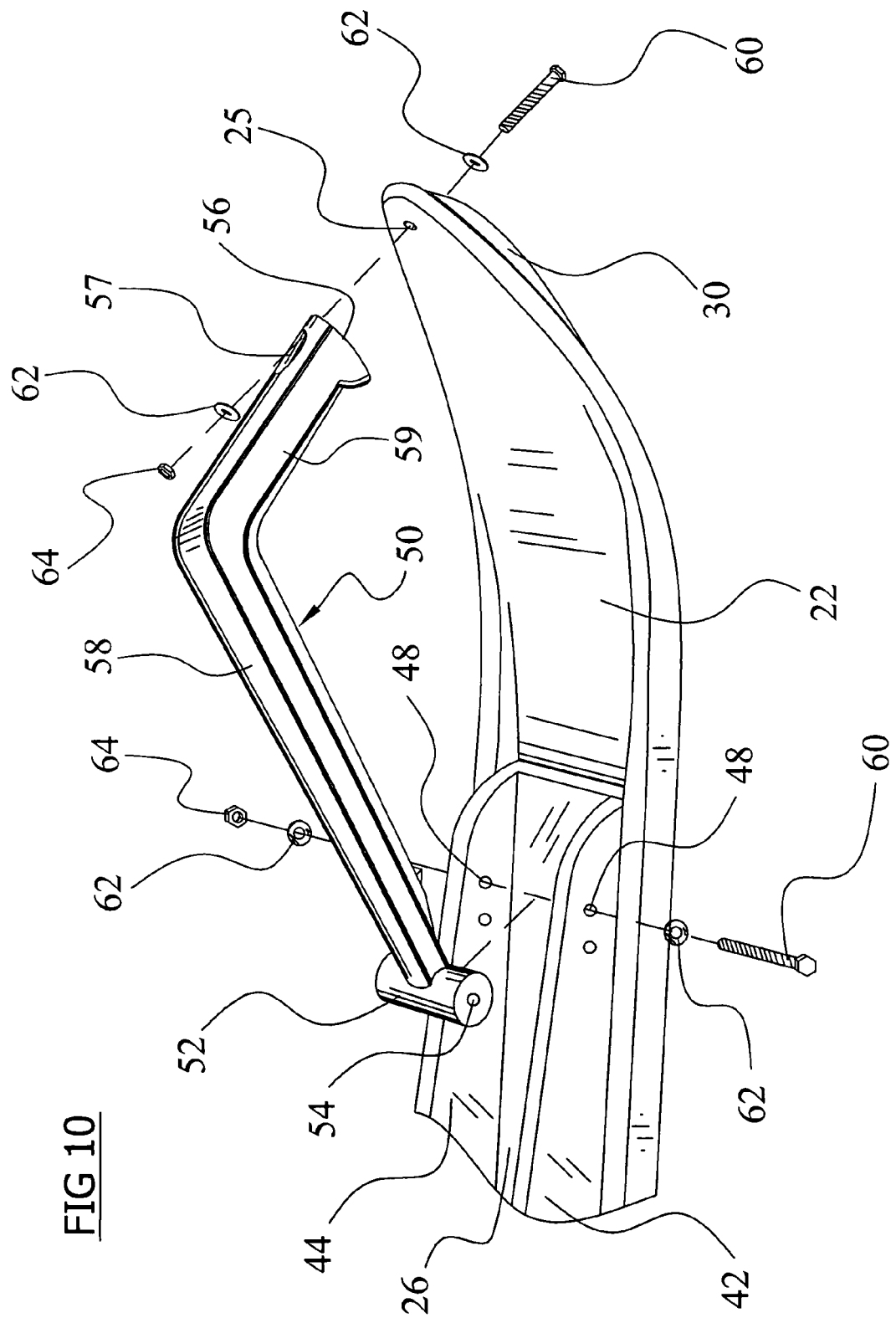
FIG. 10 is a magnified exploded perspective view of the front portion of the ski with the preload member.

The preload member 50 has a first end 52 and a second end 56 that are attached to the middle portion 26 and the front portion 22 of the elongate body 20 respectively. The second end 56 may have various shapes and structures thereto for allowing movable or non-movable attachment thereof to the front portion 22 of the elongate body 20. The second end 56 is preferably attached to or near the front end 24 of the elongate body 20 as best illustrated in FIG. 10 of the drawings. The second end 56 preferably includes at least one second aperture 57 extending through for receiving a second fastener 60 that extends through a front aperture 25 within the front end 24 of the elongate body 20. The fastener 60 secures the second end 56 of the preload member 50 to the front portion 22 of the elongate body 20 utilizing a conventional nut 64 and washer 62 combination or variations thereof. It can be appreciated that various other securing means may be utilized to secure the second end 56 of the preload member 50 to the front portion 22 of the elongate body 20.

Figure 9:
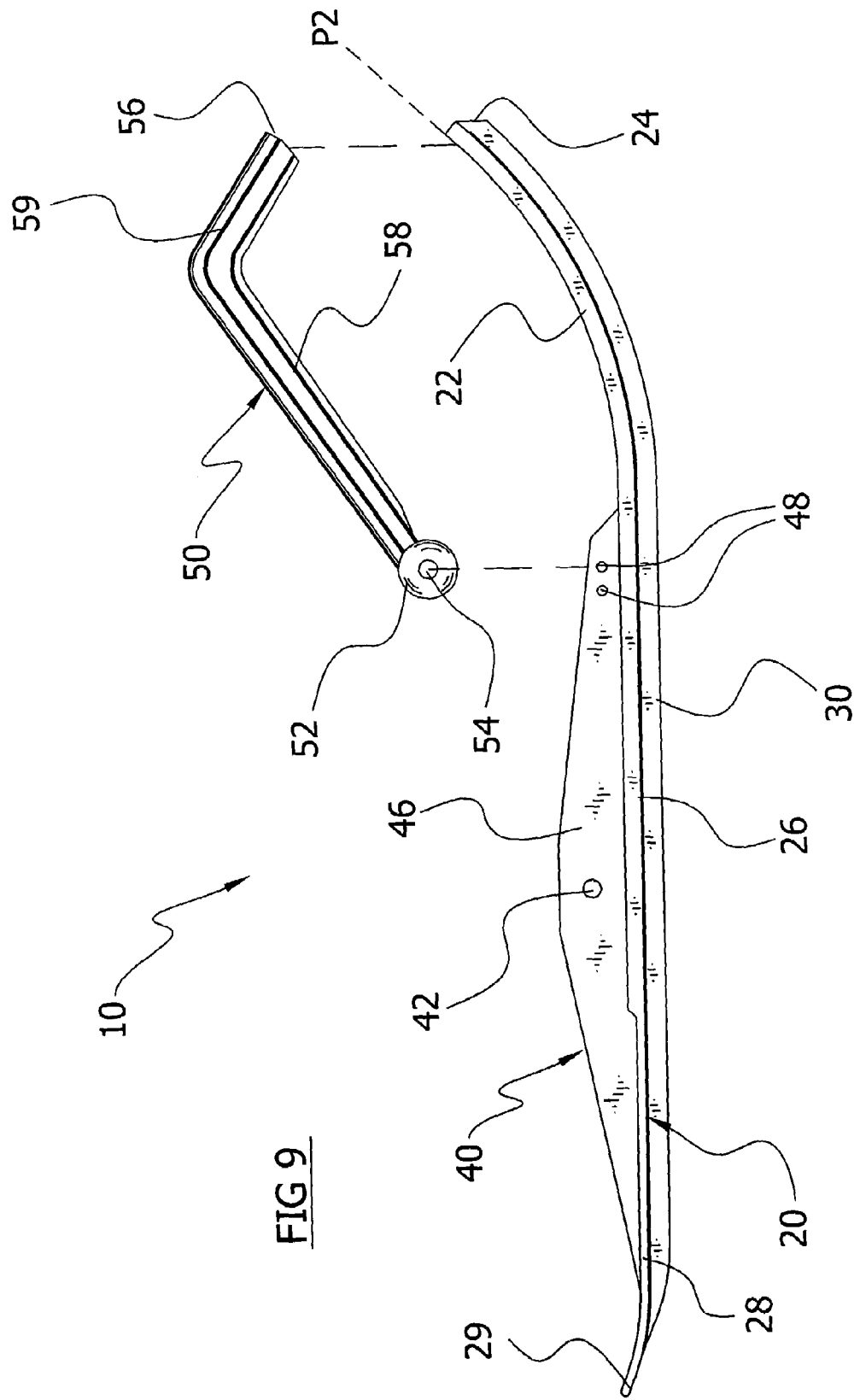
FIG. 9 is a side view of the elongate ski body positioned at position P2 with the resilient preload member positioned above the ski body prior to installation thereof.

The first end 52 may be comprised of various structures other than the tubular structure illustrated within FIGS. 9 and 10 of the drawings. The first end 52 is preferably formed to fit between the members 42, 44 of the saddle portion 40 with a fastener 60 extending through the appropriate receiving apertures 48 and a first aperture 54 within the first end 52. The first aperture 54 may have various shapes and sizes as can be appreciated to allow for the movement or non-movement of the second end 56. It can be appreciated that the first end 52 may be nonmovably or movably secured within the middle portion 26 of the elongate body 20 to achieve various results. A nut 64 and washer 62, or similar locking means, are secured about the threaded portion of the fastener 60 for securing the first end 52 of the preload member 50 to the middle portion 26 of the elongate body 20. The first end 52 may be secured by various other securing means as may be suitable for usage upon the elongate body 20.

It can be appreciated that the first end 52 or the second end 56 may be secured to the middle portion 26 or the front portion 22 of the elongate body 20 when the elongate body 20 is within the relaxed P1 position. The unattached end 52, 56 is simply attached appropriately when the front portion 22 is manipulated to intermediary position P2. In the preferred embodiment, the user secures the second end 56 of the preload member 50 to the front portion 22 prior to bending of the front portion 22 thereby allowing for simple attachment of the preload member 50.

If the second end 56 is initially attached to the front portion 22 of the elongate body 20, then the user is able to properly align the first end 52 with the desired receiving apertures 48. For example, if the user desires to have a greater preload force within the front portion 22 and the preload member 50, the user would secure the first end 52 to a pair of receiving apertures 48 further away from the front portion 22 thereby requiring intermediary position P2 to be at a greater angle with respect to initial relaxed position P1. If the user desires to have a lesser preload force within the front portion 22 and the preload member 50, the user would secure the first end 52 to a pair of receiving apertures 48 closer to the front portion 22 thereby requiring intermediary position P2 to be at a lesser angle with respect to initial relaxed position P1.

Depending upon the number of securing positions available, the user may create various levels of preloads upon the front portion 22 and the preload member 50. For example, if the first end 52 of the preload member 50 is mounted to the most forward of the variable receiving apertures 48, the amount of preload force placed upon the elongate body 20 is relatively small, therefore, providing a softer ride that is the recommended setting for riders of lighter weights. Conversely, if the first end 52 of the preload member 50 is mounted to the most rearward of the variable receiving apertures 48, the amount of preload force placed upon the elongate body 20 is relatively large, therefore, providing a stiffer ride that is the recommended setting for riders of heavier weights. These adjustments can also be made to compensate for varying types of conditions and for the type of riding to be done. Therefore, the present invention provides a means by which the handling characteristics of the skis can varied to improve the efficiency of the vehicle. This is especially important in racing where different tracks present a varying set of problems that can be overcome by simply adjusting the skis.

E. Removing the Bending Force

Figure 12:
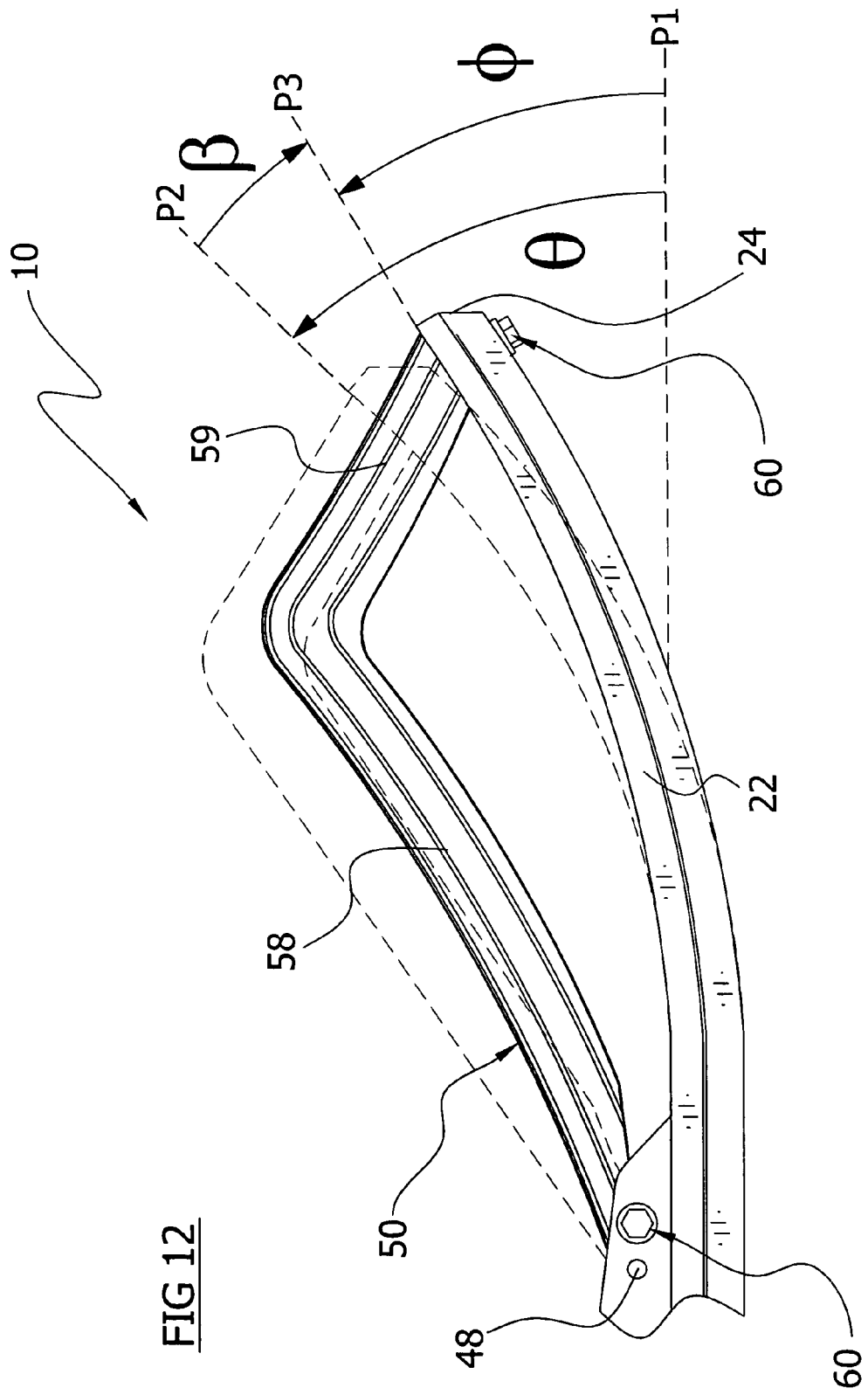
FIG. 12 is a side view of the preload member attached to the front end and the middle portion of the ski body with the front portion retained within position P3 by the preload member.
Figure 13:
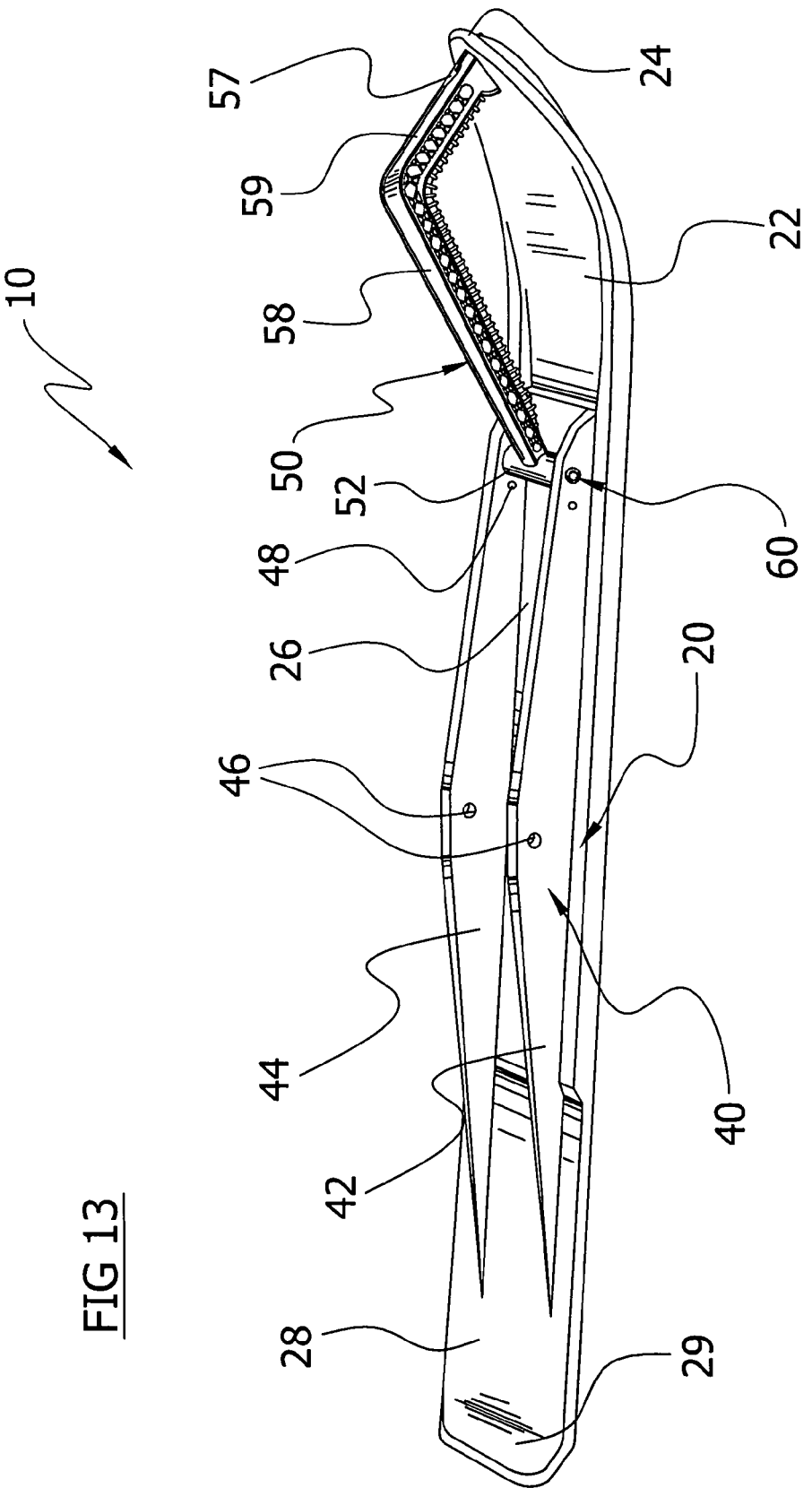
FIG. 13 is an upper perspective view of the elongate ski body and loop member with the front portion of the ski body retained within the desired curvature.

Once the preload member 50 has been fully or at least partially secured between the middle portion 26 and the front portion 22 of the elongate body 20, the user then releases the bending force from the front portion 22. It can be appreciated that the bending force may be removed prior to the attachment of the preload member 50 if the front portion 22 is bowed sufficiently to compensate for the straightening of the front portion 50 to the original molded position thereby allowing sufficient time to allow for the preload member 50 to be fully attached. The front portion 22 thereafter attempts to return to the initial relaxed position P1 except that the preload member 50 prevents the front portion 22 from returning to the relaxed position P1. The preload member 50 is able to return a finite distance to final position P3 which has an angle β with respect to intermediary position P2 and an angle φ with respect to initial position P1 as shown in FIG. 12 of the drawings. The angle β may be comprised of various angles between 0.2 to 15 degrees depending upon the stresses, materials and structures involved. The angle φ may also be comprised of various angles which typically range between 15 to 40 degrees.

The front portion 22 is able to return to final position P3 because the preload member 50 becomes stressed with an equal and opposite force of that provided by the front portion 22 which is in stress. As shown in FIG. 12 of the drawings, the preload member 50 becomes bowed because of the force applied thereto by the front portion 22 of the elongate body 20. More particularly, the first segment 58 and the second segment 59 typically have an increased angle between thereof. In addition, the first segment 58 typically gains a slight curvature thereto as is illustrated in FIG. 12 of the drawings. Different structures of the preload member 50, such as a curved structure, will similarly bow to balance the force applied by the front portion 22 of the elongate body 20.

In an alternative embodiment, if the preload member 50 is bowed prior to attachment to the elongate body 20, the front portion 22 may be manipulated only to the final position P3 without requiring addition bending to intermediary position P2. The prior bowing of the preload member 50 would thereby eliminate or significantly reduce the amount of expansion of the front portion 22 of the elongate body 20.

F. Final Product

The resulting product of the ski is a resilient elongate body 20 having a front portion 22 and a preload member 50 in constant stress. When the elongate body 20 is secured to the snowmobile or like vehicle, the user is able to operate the vehicle upon a surface covered with snow. When the front portion 22 of the elongate body 20 encounters an object such as a rock or snowdrift, the front portion 22 bends rearwardly along with the preload member 50 returning to its original relaxed structure. The preload member 50 therefore does not provide any rigid support or interference to the front portion 22 of the elongate body 20 when encountering an object and therefore allows the front portion 22 to bend throughout freely without interference. Furthermore, since the preload member 50 enters the relaxed structural state when the front portion 22 is bent upwardly and rearwardly, a "pivot point" is not created at the connect of the first end 52 of the preload member 50 to the middle portion 26 of the elongate member which allows the front portion 22 to bend throughout without interference or undue stress to the elongate body 20.

For example, when encountering an object the front portion 22 may bend rearwardly from final position P3 to intermediary position P2 wherein the preload member 50 has little or no stress within. The elongate body 20 is therefore able to provide a smooth transition over the object without causing a significant bump to the operator of the snowmobile. After the front portion 22 has passed over the object, the front portion 22 is allowed to return to final position P3 wherein the preload member 50 is again stressed. This process continues during the operation of the snowmobile providing increased control for the operator of the snowmobile in various types of terrain as a significant portion of the elongate body 20 remains in contact with the surface.

As to a further discussion of the manner of usage and operation of the present invention, the same should be apparent from the above description. Accordingly, no further discussion relating to the manner of usage and operation will be provided. Although the present invention has been described in considerable detail with reference to certain preferred versions thereof, other versions are possible. It should also be stated at this point that although this invention is described in the context of a snowmobile, this invention would be equally useful on airplane skis, BOMBARDIERS, SNO-SCOOTS, and other similar vehicles.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of manufacturing a ski, comprising the steps of:
   (a) forming an elongate body comprised of a resilient material having a front portion having a front end, a middle portion, wherein said middle portion has a longitudinal axis and wherein said front portion has an initial position;
   (b) applying a bending force to said front portion of said elongate body thereby manipulating said front portion into a bowed structure having an intermediary position which has an intermediary angle with respect to initial position; and
   (c) securing a preload member having a first end and a second end to said middle portion and to said front portion of said elongate body respectively.

2. The method of manufacturing a ski of claim 1, wherein said elongate body is comprised of an ultra high molecular weight plastic.

3. The method of manufacturing a ski of claim 1, wherein said middle portion is substantially straight.

4. The method of manufacturing a ski of claim 1, wherein said middle portion is substantially flat and planar.

5. The method of manufacturing a ski of claim 1, wherein said middle portion includes a saddle portion that receives said first end of said preload member.

6. The method of manufacturing a ski of claim 1, wherein said intermediary angle is at least 5 degrees.

7. The method of manufacturing a ski of claim 1, wherein said intermediary angle is at least 15 degrees.

8. The method of manufacturing a ski of claim 1, wherein said intermediary angle is at least 10 degrees.

9. The method of manufacturing a ski of claim 1, wherein said preload member is comprised of a first segment and a second segment, wherein said first segment is comprised of a relatively straight structure and wherein said second segment is comprised of a relatively straight structure, and wherein said first segment and said second segment have an angle between thereof greater than 90 degrees.

10. A method of manufacturing a ski, comprising the steps of:
    (a) forming an elongate body comprised of a resilient material having a front portion having a front end, a middle portion, and a rear portion having a rear end, wherein said elongate body has a longitudinal axis extending from said rear portion to said middle portion and wherein said front portion has an initial position;
    (b) securing one end of said preload member having a first end and a second end to either said middle portion or to said front portion of said elongate body respectively, wherein said preload member is comprised of a resilient material and resilient structure;
    (c) applying a bending force to said front portion of said elongate body thereby manipulating said front portion into a bowed structure having an intermediary position which has an intermediary angle with respect to initial position; and
    (d) securing a remaining end of said preload member.

11. The method of manufacturing a ski of claim 10, wherein said elongate body is comprised of an ultra high molecular weight plastic.

12. The method of manufacturing a ski of claim 10, wherein said middle portion is substantially straight.

13. The method of manufacturing a ski of claim 10, wherein said middle portion is substantially flat and planar.

14. The method of manufacturing a ski of claim 10, wherein said middle portion includes a saddle portion that receives said first end of said preload member.

15. The method of manufacturing a ski of claim 10, wherein said intermediary angle is at least 5 degrees.

16. The method of manufacturing a ski of claim 10, wherein said intermediary angle is at least 10 degrees.

17. The method of manufacturing a ski of claim 16, wherein said intermediary angle is at least 15 degrees.

18. The method of manufacturing a ski of claim 10, wherein said intermediary angle is at least 20 degrees.

19. The method of manufacturing a ski of claim 10, wherein said preload member is comprised of a first segment and a second segment, wherein said first segment is comprised of a relatively straight structure and wherein said second segment is comprised of a relatively straight structure, and wherein said first segment and said second segment have an angle between thereof greater than 90 degrees.

20. A method of manufacturing a ski, comprising the steps of:
    providing an elongate body comprised of a resilient material having a front portion having a front end, a middle portion, and a rear portion having a rear end, wherein said elongate body has a longitudinal axis extending from said rear portion to said middle portion and wherein said front portion has an initial position;
    applying a bending force to said front portion of said elongate body thereby manipulating said front portion into a bowed structure having an intermediary position which has an intermediary angle with respect to said initial position; and
    securing a preload member having a first end and a second end to said middle portion and to said front portion of said elongate body respectively.

* * * * *